United States Patent Office 3,044,262
Patented July 17, 1962

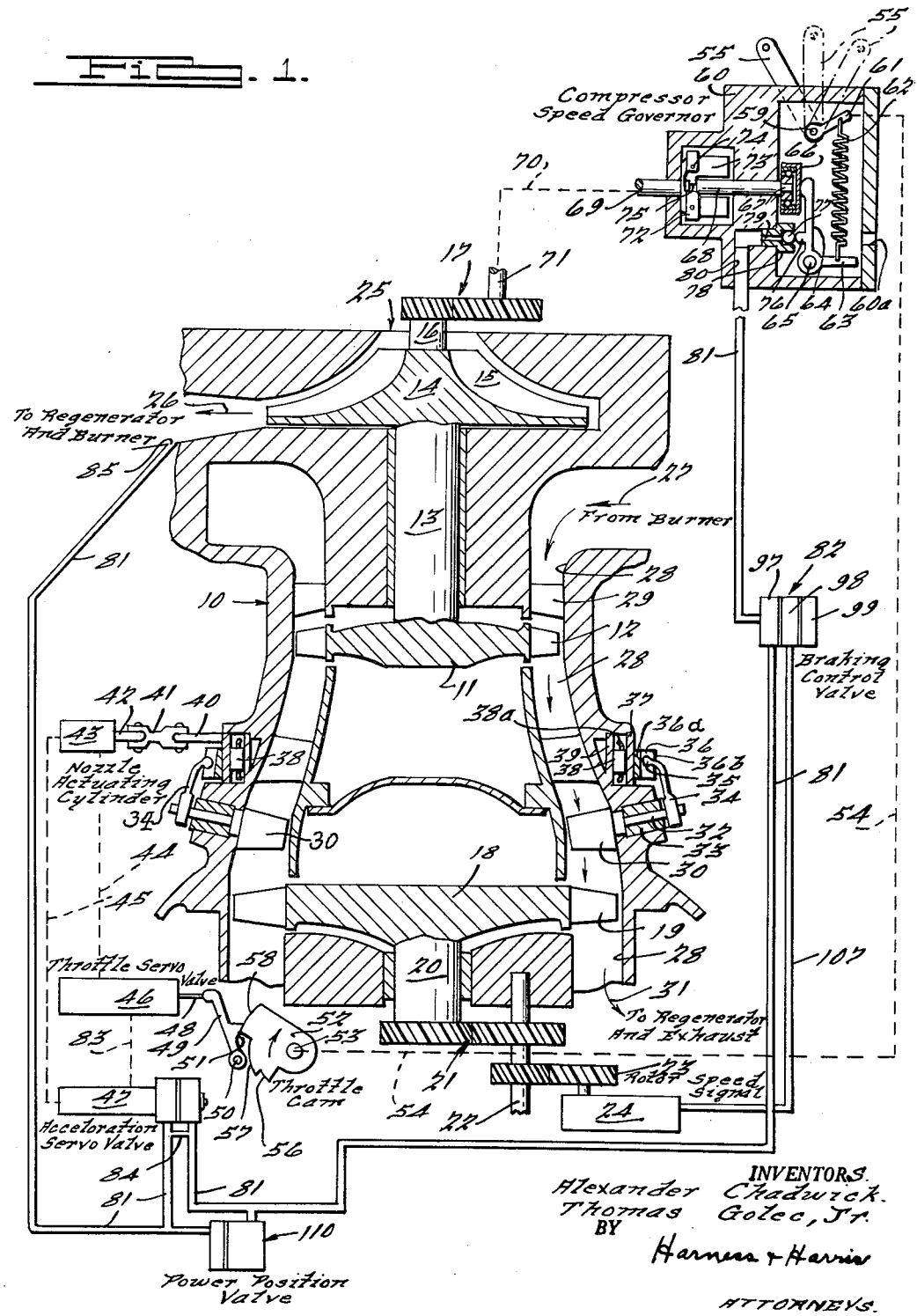

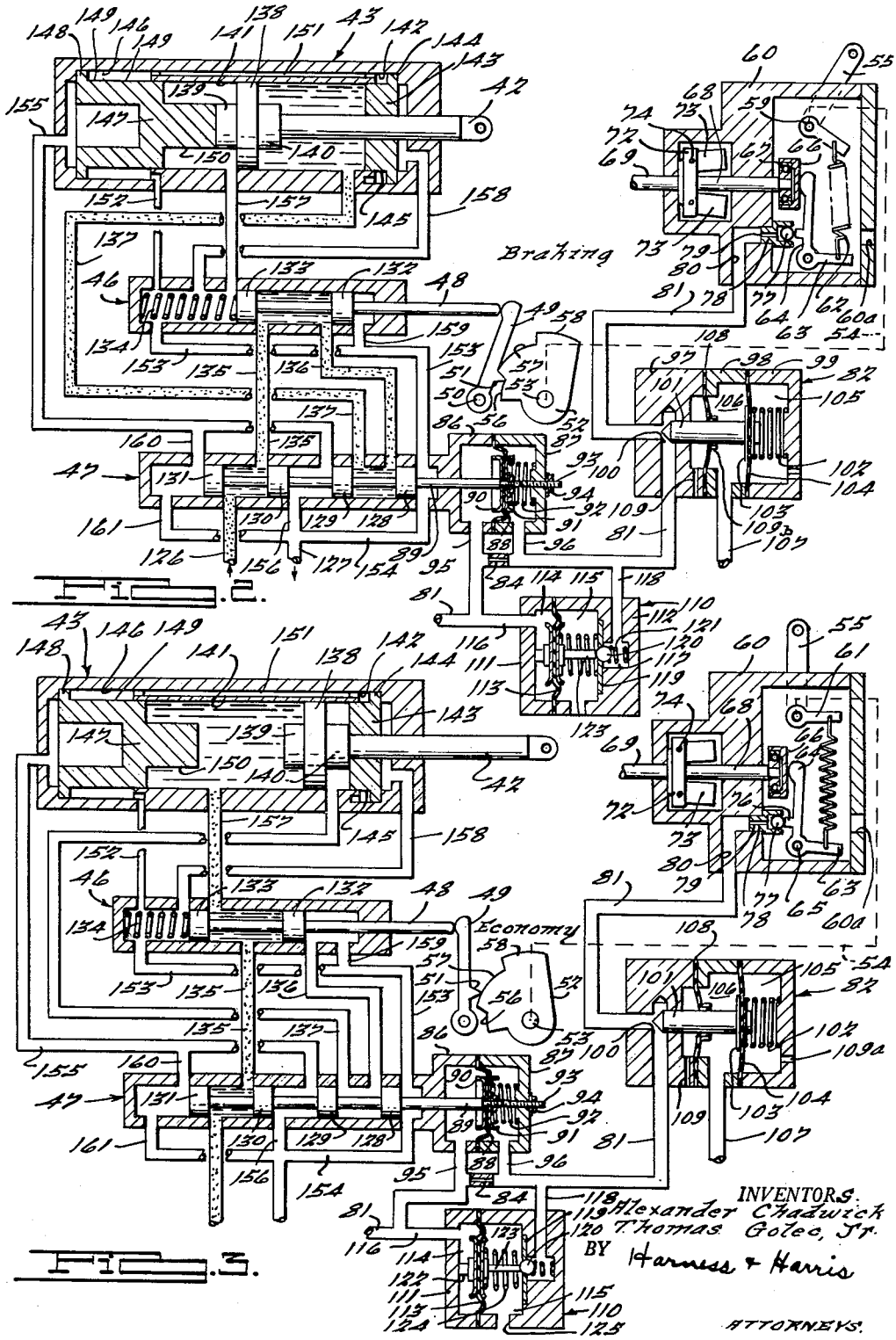

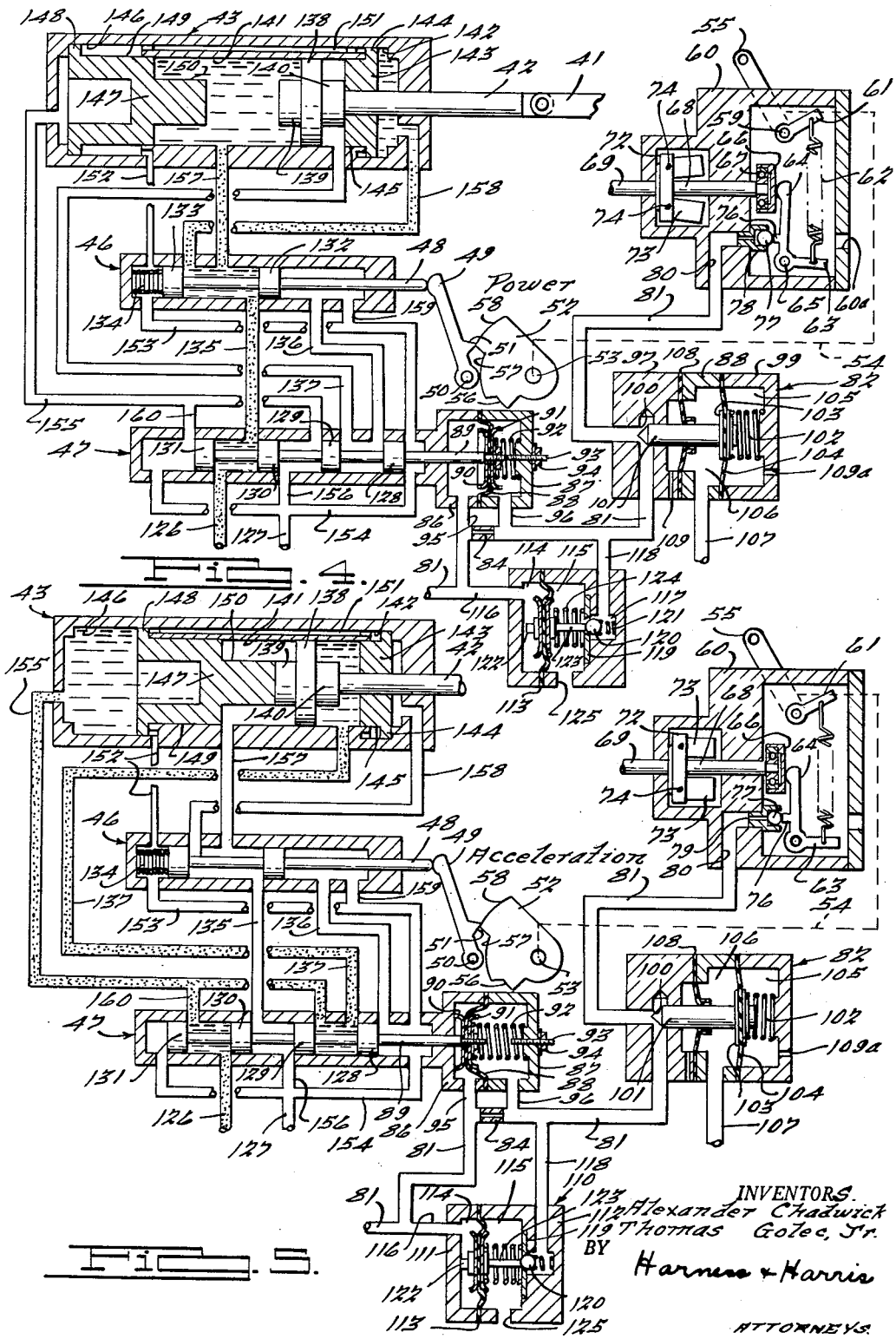

3,044,262
CONTROL MECHANISM FOR ADJUSTABLE GAS TURBINE NOZZLE
Alexander Chadwick, Farmington, and Thomas Golec, Jr., Royal Oak, Mich., assignors to Chrysler Corporation, Highland Park, Mich., a corporation of Delaware
Filed May 9, 1960, Ser. No. 27,645
24 Claims. (Cl. 60—39.25)

This invention relates to gas turbine engines and in particular to improved automatic means for adjusting the position of a variable nozzle in the flow path of the rotor driving gases of an automobile gas driven turbine engine to vary the power imparted to the engine rotors in accordance with the operating conditions of the engine and the position of its fuel supply throttle.

In one type of two-stage automobile gas turbine engine, a first stage rotor drives an air compressor which supplies combustion supporting air under comparatively high pressure to the exothermic portion of a regenerator to be heated thereby. Thereafter the air is conducted to the first and to a second rotor stage to power the same and is then exhausted through the endothermic portion of the regenerator to heat the latter. During the course of the flow of the compressor discharge air, fuel is added and burned in a combustion chamber to supply the necessary energy for driving the two rotor stages. The second rotor stage is employed to propel the automobile and is thus called the power rotor herein.

In order to proportion the driving energy to the two rotor stages in accordance with desired operating conditions of the engine, an object of the present invention is to provide an adjustable nozzle in the flow path of the driving gases at a location intermediate the two rotor stages to enable adjustment of the angle of contact between said gases and the blades of the power rotor.

During conditions of engine starting and idling, it is desirable to supply minimum driving power to the power rotor. It is accordingly another object to provide an improved nozzle actuator for the adjustable nozzle which is responsive to the position of the fuel throttle to supply minimum power to the power rotor during engine idling conditions and which is independent of the throttle position to supply minimum power to the power rotor during engine starting.

When the adjustable nozzle is positioned so that minimum power is imparted to the power rotor, the driving gases will pass comparatively freely through the blades of the latter rotor. The back pressure on the first stage or compressor driving rotor will consequently be a minimum and the pressure drop of the driving gases through the blades of the latter rotor and the power imparted thereto will be a maximum. Thus when increasing fuel is supplied to the engine and the adjustable nozzle is positioned to impart minimum power to the power rotor, optimum power will be imparted to the compressor driving rotor and the latter will be accelerated. Accordingly the position of the adjustable nozzle for imparting minimum power to the power rotor is referred to herein as an acceleration position, the acceleration being with reference to the first stage or compressor driving rotor, rather than to the second stage or power driving rotor. As defined above, the adjustable nozzle will be in the acceleration position during engine starting and idling.

Another object is to provide such a nozzle actuator which is responsive to positions of the throttle calling for increased engine power to shift to said acceleration position until the compressor output attains a predetermined value depending on the throttle setting, and thereafter to shift to a position for supplying greater power to the power rotor, depending on the throttle setting. Accordingly, when accelerating fuel is supplied to the engine, a large proportion of the added power will first be applied to the comparatively low torque air compressor to accelerate the latter to supply the necessary volume of combustion supporting air. Thereafter an increased proportion of the added power will be supplied to the power rotor to propel the automobile in accordance with the throttle setting.

Another object is to provide a nozzle actuator of the above character which is responsive to positioning of the throttle at an engine idle condition when the power rotor is operating at greater than a predetermined minimum speed, as for example greater than approximately 10 m.p.h., to shift to a braking position whereat the rotor driving gases are directed against the blades of the power rotor at an angle effective to impart a reverse power thereto, thereby to effect an engine drag to facilitate deceleration of the automobile to the aforesaid predetermined minimum speed.

Another object is to provide such a nozzle actuator having power rotor speed responsive means effective to cause shifting of the adjustable nozzle to said acceleration condition when the power rotor speed decelerates to less than said predetermined minimum speed and the throttle is at said idle position, thereby to prevent the aforesaid engine braking at speeds below said predetermined minimum speed.

Still another object is to provide a nozzle actuator of the above character having power positioning means effective to shift the adjustable nozzle from the acceleration position to a position for imparting power to the power rotor when the compressor output exceeds a predetermined high value, amounting to greater than approximately 70% to 80% of its maximum speed for example, regardless of the speed of the power rotor. Thus when the automobile is operating under high load and low speed, power from the driving gases will be transmitted to the power rotor even though the speed of the latter and of the vehicle is less than said predetermined minimum speed of approximately 10 m.p.h.

Other objects of this invention will appear in the following description and appended claims, reference being had to the accompanying drawings forming a part of this specification wherein like reference characters designate corresponding parts in the several views.

FIGURE 1 is a diagrammatic mid-sectional view through a gas turbine engine and the control means for the adjustable nozzle.

FIGURE 2 is a schematic view showing details of the control means for the adjustable nozzle in the braking condition.

FIGURE 3 is a view similar to FIGURE 2, but showing the control means in an economy condition for operating the vehicle under moderate load.

FIGURE 4 is a view similar to FIGURE 1, but showing the control means in a power condition for operating the vehicle at optimum power.

FIGURE 5 is a view similar to FIGURE 1, but showing the control means in said acceleration condition.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings and in particular to FIGURE 1, a diagrammatic layout of a gas turbine engine is illustrated comprising an engine housing 10 which contains a circular first stage or compressor driving rotor 11 having a plurality of radially extending and circumferentially spaced peripheral blades 12. The rotor 11 is mounted coaxially on a supporting shaft 13 to drive the latter which is suitably journalled within the engine housing 10 and keyed to the hub of a rotatable air compressor 14 having a plurality of circumferentially spaced and radially extending blades 15. Also driven by shaft 13 is a coaxial shaft 16 which drives a suitable speed reducing gear train, indicated generally by the numeral 17 for powering various accessory mechanisms.

Spaced axially downstream from rotor 11 is a circular second stage or power rotor 18 having a plurality of radially extending circumferentially spaced blades 19 around its periphery. The hub of the rotor 18 is mounted on a driveshaft 20 to rotate the latter, which in turn is operatively connected with the vehicle ground engaging wheels to drive the same by means of a suitable speed reducing gear train 21 and shaft 22. The latter also is operably connected by means of gear train 23 with a rotor speed signal generator 24 which operates in response to the speed of rotation of rotor 18 to emit a signal as a direct function of said speed as described below.

During operation of the engine, air is drawn into the inlet 25 of the chamber in housing 10 for compressor 14 and is discharged at comparatively high pressure at 26 by the rotating blades 15. From the compressor discharge 26, the high pressure air is directed by suitable conduit means to the comparatively hot portion of a regenerator and is heated thereby. In the present instance, the heated air from the regenerator is conducted to a burner where fuel is added and burned. The hot gaseous combustion products 27 from the burner are then conveyed by a suitable conduit system 28 to the peripheral blades 12 of the compressor driving rotor 11. Immediately upstream of rotor 11, the conduit system 28 comprises a coaxial annular portion containing a circumferentially arranged set of fixed nozzles or vanes 29 for directing the air to the blades 12 at a predetermined angle to drive the same and thus to rotate rotor 11 and compressor 14. Immediately upstream of the power rotor blades 19, the conduit system 28 also comprises an annular portion coaxial with the rotor 18 and containing a circumferentially arranged set of adjustable nozzles or blades 30 which determine the angle of contact between the driven or motive gases and the blades 19 so as to vary the power imparted thereto. From the blades 19 the gases which have given up a major portion of their energy are exhausted at 31 to the comparatively cold portion of the regenerator to heat the latter.

The adjustable nozzles 30 comprise a plurality of circumferentially spaced vanes, each being rotatable about the axis of an associated spindle 32 extending substantially radially from the axis of rotor 18. The inner end of each spindle 32 is secured to the outer end of its associated nozzle 30 to rotate the latter and is journalled within the housing 10 by means of a suitable bearing 33. The radially outer end of each spindle 32 is keyed to a swinging arm 34 extending radially from the axis of the spindle 32 and terminating at its swinging end in a rounded portion 35 confined within a slot 36 carried by an adjustable ring member 37. The latter extends coaxially around the adjacent portion of the conduit system 28 and is supported for rotatable adjustment about its center by means of a plurality of rollers 38. The latter are supported by an annular portion 39 of housing 10 and are maintained in circumferentially spaced relation with respect to each other by a cage 38a. The ring 37 carries a plurality of angle brackets, each having a base portion 36a fixed to the outer circumference of the ring 37 and also having a radially extending flange 36b. The spaces between alternate bracket flanges 36b comprise the aforesaid slots 36, one such slot being provided for the ball end of each arm 34 and opening radially of the ring 37.

At one location on the ring 37 is secured a radial bracket arm 40 which is suitably connected by means of a linkage 41 with the outer end of a nozzle actuating plunger 42. The latter extends into a nozzle actuating valve 43 in the present instance for actuation thereby, the valve 43 being interconnected as schematically indicated at 44 and 45 with a throttle servo valve 46 and an acceleration servo valve 47.

Valves 43, 46, and 47 cooperate to determine the position of nozzle actuating plunger 42 in accordance with engine operating conditions. Plunger 42, by means of its connection 41 with bracket 40, rotatably adjusts ring 37 on the rollers 38 coaxially about the fixed annular support 39, thereby to index the radial slots 36 circumferentially about the axis of rotor 18 to swing the ball end of each arm 34 about the axis of its associated spindle 32. The swinging of each arm 34 rotates the spindle and the associated nozzle blade 30 about the spindle axis. Thus the motive gases flowing axially of the annular portion of the conduit system 28 immediately in advance of the rotor blades 19 are selectively directed against the latter blades at operating angles determined by the position of angular adjustment of the nozzles 30, which in turn is determined by the position of plunger 42.

The power position of plunger 42 illustrated in FIGURE 4 is referred to herein as a reference or zero position whereat the nozzles 30 are adjusted angularly to direct the motive gases against the blades 19 so as to impart substantially maximum power thereto. The power position is obtained when the output of compressor 14 is sufficient to supply the amount of combustion supporting air required for efficiently burning the fuel supplied to the engine at comparatively high load conditions. In the present instance, the power condition requires rotation of the compressor 14 at speeds in excess of approximately 70% to 80% of its maximum intended speed, depending upon the density of the ambient atmosphere.

As explained below in regard to operation of the control circuit, the power condition is determined by the pressure of the compressor discharge air. At low altitude where the ambient air density is comparatively high, the compressor discharge air pressure required for adjusting the control circuit to the power condition will be obtained when the compressor is rotating at approximately 70% of its maximum intended speed. At higher altitudes the compressor speed must attain up to approximately 80% of its intended maximum speed to supply the necessary pressure to adjust the control circuit to the power condition. The above relationship is desirable because the amount of air required for any given fuel consumption will remain constant regardless of changes in atmospheric density. The compressor discharge pressure, rather than its speed of rotation, is a measure of the combustion air supplied by the compressor.

During engine operating conditions at moderate power loads between the aforesaid power condition of FIGURE 4 and engine idling, the control circuit will shift to an economy condition illustrated in FIGURE 3 whereat the nozzle actuating plunger 42 is extended to the limit of its rightward movement and the slotted ring 37 is rotatably advanced to rotate the nozzles 30 approximately 10° in what is termed herein a position direction from the reference power position. The nozzles 30 at the economy position direct the motive gases against the power blades 19 at an angle predetermined to drive the latter blades with optimum efficiency and economy. The economy condition is obtained during operation of the compressor at speeds between approximately 40% and the aforesaid 70% to 80% of its maximum speed, depending upon ambient air density.

It is apparent that when the nozzle angle is adjusted to increase the power imparted to the power blades 19, the back pressure upstream of the blades 19 and correspondingly the back pressure on the compressor driving rotor blades 12 will be increased and the power imparted to the latter blades will be decreased. In order to accelerate the rotor 11 and compressor 14 rapidly so as to deliver the necessary combustion supporting air when the fuel supply to the engine is increased, the control system is shifted to a transient acceleration condition as illustrated in FIGURE 5. In this condition, the nozzle actuating plunger 42 is retracted slightly from the aforesaid reference or power position of FIGURE 4 to index ring 37 rotatably in a direction from the power position opposite from the advanced economy position and thereby to swing the nozzles 30 approximately 10° in what is termed herein a negative direction from the reference power position to an acceleration position.

At the acceleration position, the nozzles 30 direct the motive gases to the power rotor blades 19 to impart a minimum power thereto and thus to effect an optimum power transfer to the blades 12 of the compressor driving rotor 11. In consequence, upon adjustment of the engine fuel supply to increase the engine power, the added power is first supplied to the comparatively low torque compressor driving rotor 11 until the speed of the latter is sufficient to supply the necessary combustion supporting air for the increased fuel. Thereafter the control system will shift either to the economy or the power condition, depending on the setting of the fuel supply throttle as explained below.

When the velocity of the vehicle is greater than a predetermined nominal speed of for example 10 m.p.h. and the fuel supply to the engine is reduced to a nominal or engine idling condition, an engine braking effect is desired. Under such conditions, the nozzle actuating plunger 42 is retracted leftward to its limit of movement as illustrated in FIGURE 2, so as to retract ring 37 rotatably and swing nozzles 30 approximately 90° in the negative direction from the reference power condition to a braking condition. At the latter condition, the nozzles 30 direct the motive gases to the power rotor blades 19 to impart a reverse driving force thereto, tending to drive the power rotor 18 in a reverse direction and to retard the forward speed of the vehicle. When the vehicle is decelerated to the aforesaid nominal speed of approximately 10 m.p.h., the control system again shifts to the acceleration condition for most economical fuel consumption. Thus the acceleration condition is obtained at engine idling and low speeds up to approximately 10 m.p.h., except when high power is demanded as aforesaid and the compressor 14 is operating in excess of approximately 70% to 80% of its maximum speed.

Referring again to FIGURE 1 in particular, the throttle servo valve 46 also actuates a plunger 48 which extends to the swinging end of a lever 49 pivoted at 50 on a fixed portion of the engine housing 10. Between the ends of lever 49, the latter is provided with an integral tapered cam follower 51 which engages the outer surface portions of a throttle cam 52 depending upon the latter's position of adjustment. Cam 52 is pivoted at 53 on a fixed portion of the engine housing and is operably connected by means indicated schematically at 54 with a throttle lever 55 for operation in unison therewith.

In the present instance, the cam 52 is provided with three distinct cam surfaces concentric with the axis of pivot 53, including an idle or braking positioning cam surface portion 56 of small radius, an economy positioning cam surface 57 of intermediate radius, and a power positioning cam surface 58 of large radius. The connection 54 may simply comprise a shaft coaxial with the pivot axes of cam 52 and throttle 55 and connecting these members for pivoting in unison so that upon clockwise or counterclockwise pivoting of lever 55, cam 52 will likewise be pivoted clockwise or counterclockwise to index the various surfaces 56, 57, and 58 selectively with the tapered follower 51.

Throttle lever 55 is pivoted at 59 on a portion 60 of the engine housing 10. A dog leg extension 61 integral with lever 55 is connected by means of a coil spring 62 with a corresponding leg 63 integral with a dog leg lever 64 pivoted in housing portion 60 at 65. The swinging end of lever 64 rides on an abutment 66 which is rotatably mounted by means of bearings 67 on the reduced end of a rotatable and coaxially shiftable shaft 68. The latter is rotatable in housing portion 60 coaxially with a speed sensor shaft 69 operably connected by linkage 70 with a driving shaft 71 of a portion of the speed reducing gear train 17. Keyed to shaft 69 for rotation therewith is a support 72 which carries a plurality of flyweights 73. Each flyweight is pivoted at 74 on the support 72 and is provided with a radially inward projection 75 which engages a notch in the left end of shaft 68 to shift the latter axially to the right upon radially outward swinging of the flyweights 73 during rotation of shaft 69.

Upon rotation of compressor 14, speed sensor shaft 69 rotates at a proportionate speed by virtue of its connection 70—17 with compressor 14. The greater the speed of rotation of compressor 14, the greater will be the centrifugal force urging pivoting of flyweights 73 about their pivots 74 outwardly with respect to the axis of shaft 69, and the greater will be the force of the flyweights urging rightward shifting of shaft 68.

Lever 64 is also provided with an intermediate projection 76 engageable with the right edge of a ball valve 77 confined within the socket of a bleed member 78 press fitted into housing portion 60. A bleed duct 79 extending centrally within member 78 connects the socket of the latter with a duct 80 formed in housing portion 60. When the speed of rotation of compressor 14 is small and the throttle lever 55 is pivoted counterclockwise to a position calling for additional engine power, the tension in spring 62 urges lever 64 counterclockwise to maintain ball valve 77 leftward in seated position against the base of its socket so as to close bleed duct 79. Duct 80 is in communication with conduit 81 which extends through a braking control valve 82 and thence through a bleed restriction 84 to the compressor discharge pressure at 85. In consequence, during low speed operation of the compressor with respect to the position of throttle lever 55, conduit 81 is subjected to the comparatively high pressure of the compressor outlet. As the speed of compressor 14 increases, thereby to increase the speed of rotation of shaft 69 and the centrifugal force on flyweights 73, the latter will swing outwardly to urge shaft 68 to the right. In consequence lever 64 will swing clockwise and enable the pressure within conduits 80, 81 to unseat ball 77. The pressure in conduit 81 will then drop rapidly as the air therein is vented by bleed duct 79 into housing portion 60 and thence to the atmosphere via vent 60a.

The pressure in conduit 81 directly actuates the acceleration servo valve 47 which comprises a two-part housing, FIGURES 2–5, including air chambers 86 and 87, FIGURE 2. The latter are suitably secured together and are separated by a flexible diaphragm 88 which is secured to the reduced right end of a two-position plunger 89 by clamps 90 and 91. The latter clamp also serves as a seat for a spring 92 under compression between the clamp 91 and a side wall of chamber 87 urging plunger 89 to the left. An adjustable stop 93 screwed through chamber portion 87 coaxially with shaft 89 limits rightward movement of diaphragm 88 to the position illustrated in FIGURE 2, for example, when the air chamber 86 at the left side of diaphragm 88 is subject to high pressure. An adjusting nut 94 secures the stop 93 in its adjusted position.

Conduits 95 and 96 communicate with chambers 86 and 87 respectively and with conduit 81 at the upstream and downstream sides respectively of bleed restriction 84. When the centrifugal force on flyweights 73 is sufficient to urge shaft 68 rightward to enable unseating of ball valve 77 from the opening of bleed 79 and thereby to exhaust duct 81 to atmosphere, a pressure drop will exist across restriction 84, the high pressure being conveyed by duct 95 to the left chamber 86 and the low or atmospheric pressure being conveyed by a duct 96 to the right chamber 87. The comparatively high pressure in chamber 86 urges diaphragm 88 to the right against the force of spring 92 to the limit of movement permitted by stop 93, as illustrated in FIGURES 2, 3, and 4. In this action, the plunger 89 of the acceleration servo valve 47 is shifted to the right to position the latter valve accordingly. On the other hand, when the speed of rotation of compressor 14 is sufficiently low in comparison to the power demand determined by the position of throttle lever 55, so that spring 62 maintains projection 76 firmly against ball valve 77 and the latter is maintained seated against bleed duct 79 to close the latter, no pressure drop will exist across restriction 84 and the pressures in chambers 86 and 87 will be the same. In this event, the force of spring 92 will urge diaphragm 88 leftward to the acceleration position illustrated in FIGURE 5 and the acceleration servo valve plunger 89 will be positioned leftward to effect acceleration adjustment of nozzles 30 by reason of the aforesaid interconnection 45 between the accelerating servo valve 47 and the nozzle actuating cylinder 43 as described below.

In FIGURE 2, the control means is illustrated in the braking position whereat the throttle lever 55 is swung clockwise to the idle position shown to position the idle cam or braking surface 56 in contact with the follower 51, and the vehicle is traveling at speeds in excess of a predetermined minimum, as for example approximately 10 m.p.h. At the braking position an engine drag is effected as aforesaid, to assist deceleration of the vehicle. This engine drag may be comparable to the drag noticeable in the conventional piston powered engine when the accelerator is released to the idle position. In order to prevent braking or engine drag at vehicle speeds less than approximately 10 m.p.h., braking control valve 82 is provided in conduit 81 at a location between restriction 84 and bleed orifice 79.

Valve 82 comprises a three-part housing fixed with respect to housing 10 and including a portion 97 containing conduit 81. Suitably secured to the portion 97 is housing portion 98 which defines a fluid chamber 106 in communication with the rotor speed signal member 24 by means of conduit 107. The third housing portion 99 is secured to housing portion 98. Housing portion 97 also provides a valve orifice 100 in conduit 81 adapted to be closed or opened by operation of a shiftable plunger 101. The latter extends to the right through housing portion 97 and into housing portions 98 and 99 and is urged leftward by a spring 102 under compression between the wall of housing 99 and a spring retainer 103 which also provides a backing for a flexible diaphragm 104 secured to plunger 101. Diaphragm 104 is clamped between housing portions 98 and 99 to partition the same and to define separate chambers 105 and 106 in housing portions 99 and 98, respectively. A flexible sealing diaphragm 108 clamped between and partitioning housing portions 97 and 98 engages plunger 101 in sealing contact at 109b, FIGURE 2, to provide a left wall for chamber 106. Air vents 109 and 109a at the left of diaphragm 108 and at the right of diaphragm 104 enables flexibility of movement of these diaphragms in accordance with the balance of the fluid pressure force in chamber 106 and the force of spring 102, FIGURES 3–5.

The rotor signal 24 may comprise a conventional fluid pump operably connected with the speed reduction gear 23 to be driven thereby at a speed proportional to the speed of rotation of power rotor 18. In consequence, the greater the speed of rotor 18, the greater will be the pressure developed in conduit 107 and the greater will be the pressure force against diaphragm 104 urging the latter rightward against the tension of spring 102. The rotor speed signal member 24 is determined so that when the vehicle speed exceeds approximately 10 m.p.h., diaphragm 104 and plunger 101 connected therewith will move to the right and open orifice 100 to establish communication between restriction 84 and bleed duct 79. In consequence, at speeds in excess of 10 m.p.h., the control means can be shifted to the braking position illustrated in FIGURE 2.

At vehicle speeds below 10 m.p.h., the pressure developed by rotor speed signal member 24 will be insufficient to shift plunger 101 to the right and open orifice 100. Orifice 100 will be closed and communication between restriction 84 and bleed duct 79 will be closed. The pressures at opposite sides of diaphragm 88 for the acceleration servo valve 47 will be equalized, spring 92 will shift diaphragm 88 and plunger 89 leftward to the acceleration position illustrated in FIGURE 5, nozzle actuating plunger 42 will shift to the position illustrated in FIGURE 5, and no engine braking will take place. Also, when the throttle lever is shifted to the idle position illustrated in FIGURE 2 and the vehicle speed is less than approximately 10 m.p.h., the overall control circuit will be at an engine idle condition and the nozzles will be at the aforesaid acceleration condition.

In order to shift the nozzles from the acceleration position when the throttle is shifted to a position demanding increased power and the vehicle speed is less than 10 m.p.h. during conditions of high engine load, as for example when the vehicle is in a steep climb, a power valve 110 is provided comprising a two-part housing 111 and 112 partitioned by a flexible diaphragm 113 into chambers 114 and 115. Chamber 114 is connected by means of duct 116 with conduit 81 at a location between restriction 84 and the high pressure of the compressor discharge 26. Chamber 115 opens into a valve chamber 117 in communication with conduit 81 downstream of restriction 84 by means of duct 118, FIGURE 2. A valve plate 119 having a central bleed orifice separates chambers 115 and 117 and provides a seat for a ball valve 120 within chamber 117. A spring 121 under compression between chamber portion 112 and the right side of ball 120 yieldingly urges the latter against the central orifice of plate 119 to close that orifice. Secured to opposite sides of diaphragm 113 are plungers 122 and 123, the former serving as a stop to limited leftward movement of diaphragm 113 and the latter extending to ball valve 120. Coil spring 124 is arranged around plunger 123 under compression between plate 119 and the diaphragm 113 urging the latter leftward to the position illustrated.

During operation of the engine under high load and low speed as aforesaid, the rotor speed signal member 24 will not be sufficient to open orifice 100 and establish communication between restriction 84 and bleed 79. Accordingly, without provision to the contrary, the engine would operate in the acceleration position as described. However when the throttle lever 55 is shifted forward to the power position illustrated in FIGURE 4, the speed of rotation of compressor 14 will rapidly increase to approximately 70% to 80% of its optimum speed at maximum load. At such a speed, the pressure buildup at 26 and directed by conduits 81 and 116 to chamber 114 will be sufficient to move diaphragm 113 and plunger 123 rightward to cause unseating of valve 120. In consequence, duct 81 at the right of restriction 84 will be vented to the atmosphere by duct 118, chambers 117 and 115 and vent 125. A pressure drop will thus result across restriction 84 enabling the pressure in chamber 86 to shift the acceleration servo valve rightward from the acceleration position of FIGURE 5 to the power position of FIGURE 4, regardless that the vehicle speed is below the nominal speed at which valve orifice 100 opens.

Details of the interconnections 44, 45, and 83 between the valves 43, 46, and 47 are described with reference to FIGURES 2–5 wherein the last-named valves are actuated by fluid pressure supplied through an inlet duct 126 and exhausted through an exhaust duct 127. The inlet duct 126 is suitably connected with a source of pressurized fluid, as for example a conventional engine driven fluid pump, not shown, and duct 127 exhausts to the low pressure side of the pump. In each of the FIGURES 2–5, the portions of the duct system subject to the pressurized fluid of conduit 126 is stippled, whereas the unstippled portions of the duct system are connected to the exhaust 127.

When the control system is in the braking condition of FIGURE 2, the vehicle is ordinarily decelerating from a speed in excess of approximately 10 m.p.h. and the throttle lever 55 is shifted clockwise to the idle position. A characteristic of the braking condition is that conduit 81 downstream of the restriction 84 is vented by unseating of ball valve 77. Ordinarily, when the vehicle speed drops below the aforesaid 10 m.p.h., braking control valve 82 closes orifice 100 and renders the opening of bleed duct 79 ineffective. Braking will thus not ordinarily occur at vehicle speeds less than 10 m.p.h. The system will shift instead to the accelerating condition for optimum fuel economy. In the transient condition when the vehicle speed is less than approximately 10 m.p.h. and orifice 100 is closed, but the speed of compressor 14 is greater than approximately 70% to 80% of its maximum speed, ball valve 120 in power valve 110 will be unseated to vent duct 81 downstream of restriction 84 to atmosphere via vent port 125. Thereafter if throttle lever 55 is shifted to the idle position shown in FIGURE 2, the braking condition will result. This latter condition will last only momentarily until the speed of compressor 14 drops below 70% to 80% of its maximum speed and ball valve 120 seats to prevent bleeding of duct 81. The system will then shift to the acceleration condition, as explained below, for optimum fuel economy.

Referring still to FIGURE 2, in the braking condition whereat either ball valve 77 or 120 is open or unseated and the throttle lever 55 and cam 52 are at their idle positions shown, valve plungers 48 and 89 will be at their rightward limits of movement. The two-position plunger 89 extends leftward into a cylindrical housing portion of valve 47 and carries four axially spaced lands 128, 129, 130, and 131 which partition the aforesaid cylindrical portion of valve housing 47 into five parts. The three-position plunger 48 extends leftward into a cylindrical housing of valve 46 and carries two axially spaced lands 132 and 133 which partition the latter cylinder into three parts. A coil spring 134 under compression between the left end of valve 46 and land 133 yieldingly urges plunger 48 rightward into contact with the rounded swinging end of lever 49. Pressurized fluid from inlet duct 126 enters valve 47 between lands 130 and 131 and discharges from valve 47 via duct 135 into valve 46 between lands 132 and 133. From valve 46, the pressure is discharged via duct 136 back into valve 47 between lands 128 and 129 and is thence discharged into duct 137.

The nozzle actuating plunger 42 extends leftward into a cylindrical housing for valve 43 and terminates in an integral piston land 138 for fluid actuation thereby. Spacers 139 and 140 are provided coaxially and integral with the left and right faces respectively of land 138. The latter land is reciprocable within a cylindrical portion 141 of valve 43 which enlarges at the right for a comparatively short axial distance to comprise cylindrical portion 142. A slideable piston land 143 rides coaxially on plunger 42. The right end of land 143 is enlarged radially at 144 for confinement within chamber enlargement 142 and is adapted to ride therein in fluid sealing relation. Leftward of the enlargement 144, a reduced portion of land 143 rides coaxially in fluid sealing and guided relationship within cylindrical portion 141.

Leftward of the cylindrical portion 141, the chamber of valve 43 is enlarged cylindrically at 146 to accommodate a radially enlarged portion 148 at the left end of piston land 147. Land portion 148 is adapted to ride in fluid sealing relation within the cylindrical enlargement 146. A reduced cylindrical body portion 149 of land 147 to the right of enlargement 148 is shiftable coaxially in fluid sealing relation within cylindrical portion 141. To the right of land extension 149 is an integral reduced extension 150 of land 147 adapted to abut spacer 139, depending upon the relative positions of lands 138 and 147 as described below.

Duct 137 conducts the pressurized fluid in FIGURE 2 into cylindrical portion 141 of valve 43 between lands 138 and 143, thereby to shift these lands leftward and rightward respectively to their limits of movement permitted by the housing of valve 43. Accordingly, nozzle actuating plunger 42 is retracted leftward to the limit of its movement so as to rotate ring 37 and swing nozzles 30 reversely to the aforesaid braking condition whereat forward rotation of rotor 18 is resisted and engine braking is accomplished.

Also as illustrated in FIGURE 2, exhaust duct 151 connects the chamber portion 142 at the left of land enlargement 144 with chamber 146 at the right of land enlargement 148. Exhaust duct 152 connects chamber enlargement 146 at the right of land enlargement 148 with the spring containing chamber of valve 46. Duct 153 extends from the last-named chamber to valve 47 at the right of land 128 and is thus connected to the exhaust conduit 127 by duct 154. Duct 155 connects the chamber of valve 43 at the left end of land 147 to valve 47 between lands 129 and 130 and is thence connected to exhaust 127 via duct 156. Likewise duct 157 connects the chamber of valve 43 between the right face of land 149 and the left face of land 138 with the spring containing exhaust chamber of valve 46 at the left of land 133. Duct 158 connects valve 43 at the right of land 144 to the aforesaid spring retaining exhaust chamber of valve 46 at the left of land 133. Duct 159 connects valve 46 at the right of land 132 to conduit 153 and thence to exhaust as aforesaid. Also ducts 160 and 161 connect valve 47 at the left of land 131 to ducts 155 and exhaust duct 127 respectively.

Referring to FIGURE 3, the control system is illustrated in the economy condition having the characteristic that throttle 55 is at the intermediate position shown so that cam follower 51 rides on the intermediate cam surface 57 of throttle cam 52. This position will be obtained throughout a range of throttle positions determined by the circumferential extent of cam surface 57 and causes plunger 48 to be shifted leftward to an intermediate position whereat land 132 closes duct 136 from the pressurized fluid and land 133 connects duct 157 with the pressurized fluid. Thus duct 137 and the portion of valve 46 to the right of land 132 are connected via ducts 136, 159, and 153 to exhaust as in FIGURE 2. In consequence, the pressure to the right of land 138 in valve 43 is conducted via duct 137 to exhaust, so that the fluid pressure entering valve 43 via duct 157 forces land 138 to the limit of its rightward movement to rotatably advance ring 37 and index the several nozzles 30 to the economy position approximately 10° in advance of the aforesaid reference or maximum power position.

Although only one intermediate cam surface 57 is illustrated, it is apparent that by adding additional cam surfaces of varying radii intermediate the minimum radius of idle cam surface 56 and the maximum radius of the power cam surface 58, additional positions of adjustment can be readily obtained for adjusting the nozzles 30 at other intermediate power receiving conditions. Also, although the economy condition exists at a moderate range of throttle positions, when the throttle lever 55 is shifted counterclockwise so as to call for increased power in the economy range, the sudden increase in tension of spring 62 will cause ball valve 77 to close bleed duct 79. The system will then temporarily shift automatically to the acceleration condition until the speed of compressor 14 accelerates to match the new throttle setting. This acceleration condition will be transitory, after which the flyweights 73 will urge shaft 68 rightward and lever 64 clockwise to enable unseating of the ball valve 77 and the opening of duct 79 so as to restore the economy condition.

Referring to FIGURE 4, the power condition is illustrated having the characteristic that throttle lever 55 is shifted counterclockwise to the upper power range until cam follower 51 rides on the power cam surface 58 of throttle cam 52. In consequence, plunger 48 is shifted leftward to the limit of its movement so as to connect duct 158 as well as duct 157 to the fluid pressure. The remaining ducts are connected to exhaust as in FIGURE 3. In accordance with the power setting, pressurized fluid entering valve 43 at the right of land 144 urges the latter leftward to the limit of movement permitted by the axial extent of the cylindrical enlargement 142. Although the fluid pressure at the right of land 144 and at the left of land 138 is the same, the area at the right of land 144 is greater than the area at the left of land 138. The latter and plunger 42 are thus retracted leftward to the reference or power position. Likewise ring 37 and the several nozzle blades 30 will be indexed to the zero or reference power position to cause maximum power to be imparted to the rotor blades 19.

In the power condition, the compressor 14 will be rotating in excess of 70% to 80% of its maximum speed, so that ball valve 120 will be unseated to bleed air pressure from duct 81 at the right of restriction 84. Accordingly, regardless whether the vehicle speed is in excess of 10 m.p.h. and orifice 100 to bleed duct 79 is open, the power condition will be obtained. In FIGURE 4, orifice 100 is illustrated as being open because the power condition is commonly associated with high speed.

FIGURE 5 illustrates the acceleration condition having the characteristic that neither bleed valve 77 nor 120 is unseated and the air pressure at opposite sides of diaphragm 88 of the acceleration servo valve 47 is balanced. In consequence, spring 92 urges plunger 89 leftward to its limit of movement shown, thereby to disconnect duct 135 from the pressurized fluid and to connect the latter duct to exhaust via duct 156. At the leftward position of plunger 89, lands 130 and 131 connect ducts 160 and 155 and thus the left end of valve 43 to the pressurized fluid. Also duct 137 and the cylindrical space between lands 138 and 143 are connected to the pressurized fluid. The remaining ducts are connected to exhaust 127 as in FIGURE 3. It is apparent in the acceleration condition of FIGURE 5 that the throttle servo valve 46 is bypassed so that the position of the throttle cam 52 is rendered inconsequential.

By virtue of the larger effective area at the left of land 148 as compared to the effective area at the right of land 138, land 147 will be moved rightward to the limit of axial movement permitted by axial shifting of land 148 in cylindrical enlargement 146. The abutment portion 150 of land 147 serves as a leftward movement limiting stop for land 138 which is thus maintained at a position retracted slightly from the power position of FIGURE 4. In consequence, plunger 42 and ring 37 are retracted and the several nozzles 30 are indexed approximately 10° in the reverse direction from the power position to the acceleration position whereat minimum power is imparted to the blades 19 and maximum power for the amount of fuel supplied is imparted to the blades 12 of the compressor driving rotor 11.

Ordinarily the acceleration condition will be obtained when the throttle lever 55 is shifted counterclockwise to increase the engine power, thereby to close bleed duct 79 by virtue of the tension of spring 62 acting through projection 76 on ball valve 77. Spring 62 will maintain ball valve 77 at the position closing bleed duct 79 until the speed of compressor 14 and the centrifugal force of the flyweights 73 increases sufficiently to overcome the force of spring 62 and enable unseating of ball valve 77. The opening of the bleed at the right of restriction 84 enables the air pressure at the left of diaphragm 88 to force the latter rightward against the tension of spring 92 to the economy or power position, depending on the position of the throttle cam 52 as described above.

It is also apparent that the acceleration position will be obtained during engine idling or starting as described above when the vehicle speed is less than approximately 10 m.p.h. and orifice 100 is closed by plunger 101 from bleed duct 79; or during periods of deceleration upon shifting from the engine braking position when the vehicle speed falls below 10 m.p.h. to close orifice 100 by plunger 101. Accordingly, at such low speeds when the throttle is at the idle condition of FIGURE 2 for example, the control system will shift to the acceleration condition for optimum economy of operation.

We claim:

1. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable nozzle means interposed in the path of said gases and shiftable to adjust the angle of contact therewith to vary the power imparted to said rotors by said gases, one of the positions of adjustment of said nozzle means comprising an accelerating position for imparting comparatively low power to said power rotor and comparatively high power to said compressor driving rotor, control means for adjusting said nozzle means including throttle responsive means for adjusting said nozzle means in accordance with the setting of said throttle means and also including means responsive to the pressure of the air supplied by said compressor for adjusting said nozzle means to said accelerating position during predetermined operating conditions of said engine regardless of the setting of said throttle means.

2. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotor by said gases, one of the positions of adjustment of said adjustable means comprising a compressor accelerating position for imparting comparatively low power to said power rotor and comparatively high power to said compressor driving rotor, control means for adjusting said adjustable means in accordance with the setting of said throttle means and also for shifting said adjustable means to said accelerating position when the speed of said compressor driving rotor is less than a predetermined value depending on the setting of said throttle means, said control means also including means for blocking movement of said adjustable means from said accelerating position until said power rotor exceeds a predetermined speed.

3. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotors by said gases, one of the positions of adjustment of said adjustable means comprising a compressor accelerating position for imparting comparatively low power to said power rotor, control means for adjusting said adjustable means, said control means including throttle responsive means for adjusting said adjustable means in accordance with the setting of said throttle means and also including governor means responsive to the speed of said compressor for shifting said adjustable means to said accelerating position when the speed of said compressor driving rotor is less than a predetermined value depending on the setting of said throttle means, said control means also including means responsive to the speed of said power rotor for blocking operation of said governor means until said power rotor exceeds a predetermined speed.

4. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotors by said gases, one of the positions of adjustment of said adjustable means comprising a compressor accelerating position for imparting comparatively low power to said power rotor and comparatively high power to said compressor driving rotor, control means for adjusting said adjustable means in accordance with the setting of said throttle means and also for shifting said adjustable means to said accelerating position when the speed of said compressor driving rotor is less than a predetermined value depending on the setting of said throttle means, said control means also including means for blocking movement of said adjustable means from said accelerating position until said power rotor exceeds a predetermined speed and for blocking movement of said adjustable means to said accelerating position when the output of said compressor exceeds a predetermined value regardless of the speed of said power rotor.

5. In a multiple stage gas turbine engine having a compressor driving rotor in one stage and a power rotor in a subsequent stage, an air compressor driven by said compressor driving rotor for supplying an output of combustion air to said engine, operable throttle means for supplying fuel to said engine, means for conducting motive gases to said rotors to rotate the same, adjustable means in the path of said gases for varying the power imparted to said rotors by said gases, one of the positions of adjustment of said adjustable means comprising a compressor accelerating position for imparting comparatively lower power to said power rotor and comparatively high power to said compressor driving rotor, control means for adjusting said adjustable means in accordance with the setting of said throttle means and also for shifting said adjustable means to said accelerating position when the speed of said compressor driving rotor is less than a predetermined value depending on the setting of said throttle means and for blocking movement of said adjustable means to said accelerating position when the output of said compressor exceeds a predetermined value.

6. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotors by said gases, said adjustable means being shiftable to a compressor accelerating position and to a power position for imparting comparatively low power and comparatively high power respectively to said power rotor and being shiftable to a braking position for imparting reverse power to said power rotor, control means for adjusting said adjustable means to said power and braking positions in accordance with the setting of said throttle means and also for shifting said adjustable means to said accelerating position when the speed of said compressor driving rotor is less than a predetermined value depending on the setting of said throttle means, said control means also including means for shifting said adjustable means from said braking position to said accelerating position upon deceleration of said power rotor to less than a predetermined minimum speed.

7. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotors by said gases, said adjustable means being shiftable to a compressor accelerating position and to a power position for imparting comparatively low power and comparatively high power respectively to said power rotor and being shiftable to a braking position for imparting reverse power to said power rotor, control means for adjusting said adjustable means to said power and braking positions, said control means including throttle responsive means for adjusting said adjustable means in accordance with the setting of said throttle means and also including governor means responsive to the speed of said compressor for shifting said adjustable means to said accelerating position when the speed of said compressor driving rotor is less than a predetermined value depending on the setting of said throttle means, said control means also including means for shifting said adjustable means from said braking position to said accelerating position upon deceleration of said power rotor to less than a predetermined minimum speed.

8. In a multiple stage gas turbine engine having a compressor driving rotor in one stage and a power rotor in a subsequent stage, an air compressor driven by said compressor driving rotor for supplying an output of combustion air to said engine, operable throttle means for supplying fuel to said engine, means for conducting motive gases to said rotors to rotate the same, adjustable means in the path of said gases for varying the power imparted to said rotors by said gases, said adjustable means being shiftable to a compressor accelerating position and to a power position for imparting comparatively low power and comparatively high power respectively to said power rotor and being shiftable to a braking position for imparting reverse power to said power rotor, control means for adjusting said adjustable means to said power and braking positions in accordance with the setting of said throttle means and also for shifting said adjustable means to said accelerating position when the output of said compressor is less than a predetermined value depending on the setting of said throttle means and for blocking movement of said adjustable means to said accelerating position when the output of said compressor exceeds a predetermined value, said control means also including means for shifting said adjustable means from said braking position to said accelerating position upon deceleration of said power rotor to less than a predetermined minimum speed.

9. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotors by said gases, and control means including throttle responsive means for shifting said adjustable means in accordance with operation of said throttle means, compressor accelerating means effective to overrule said throttle responsive means to shift said adjustable means to a compressor accelerating position for imparting comparatively high power to said compressor driving rotor, and compressor responsive means and second throttle responsive means operable in opposition to each other to actuate said compressor accelerating means to shift said adjustable means to said compressor accelerating position when said compressor is operating at less than a predetermined rate determined by operation of said throttle means, said compressor responsive means being effective as a direct function of the rate of operation of said compressor to overrule actuation of said compressor accelerating means tending to shift said adjustable means to said compressor accelerating position, said second throttle responsive means being effective to actuate said compressor accelerating means to shift said adjustable means to said compressor accelerating position as a direct function of the operation of said throttle means tending to accelerate said engine.

10. In the combination according to claim 9, said control means also including means responsive to the speed of said power rotor opposing the effectiveness of said compressor responsive means until said power rotor attains a predetermined minimum speed.

11. In the combination according to claim 9, said control means also including means responsive to the speed of said power rotor opposing the effectiveness of said compressor responsive means until said power rotor attains a predetermined minimum speed, and means responsive to predetermined operation of said compressor to oppose operation of said compressor accelerating means and enable operation of said throttle responsive means to adjust said adjustable means in accordance with the setting of said throttle means.

12. In the combination according to claim 9, said control means also including means responsive to predetermined operation of said compressor to oppose operation of said compressor accelerating means and enable operation of said throttle responsive means to adjust said adjustable means in accordance with the setting of said throttle means.

13. In the combination according to claim 9, said throttle responsive mean being effective to shift said adjustable means to a braking position for imparting reverse power to said power rotor in accordance with a setting of said throttle means to decelerate said engine, and said control means including means responsive to the speed of rotation of said power rotor for actuating said compressor accelerating means to shift said adjustable means to said compressor accelerating position when said power rotor decelerates to less than a predetermined minimum speed.

14. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotors by said gases, and control means including throttle responsive means for shifting said adjustable means in accordance with operation of said throttle means, compressor accelerating means effective to overrule said throttle responsive means to shift said adjustable means to a compressor accelerating position for imparting comparatively high power to said compressor driving rotor, shiftable means for actuating said compressor accelerating means, and compressor responsive means and second throttle responsive means operable in opposition to each other on said shiftable means to shift the same to actuate said compressor accelerating means to shift said adjustable means to said compressor accelerating position when said compressor is operating at less than a predetermined rate determined by operation of said throttle means, said compressor responsive means acting on said shiftable means to shift the same with a force amounting to a direct function of the rate of operation of said compressor, said second throttle responsive means acting on said shiftable means to shift the same with a force amounting to a direct function of the operation of said throttle means tending to accelerate said engine.

15. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotors by said gases, and control means including throttle responsive means for shifting said adjustable means in accordance with operation of said throttle means, compressor accelerating means effective to overrule said throttle responsive means to shift said adjustable means to a compressor accelerating position for imparting comparatively high power to said compressor driving rotor, shiftable means for actuating said compressor accelerating means, and compressor responsive means and second throttle responsive means operable in opposition to each other on said shiftable means to shift the same to actuate said compressor accelerating means to shift said adjustable means to said compressor accelerating position when said compressor is operating at less than a predetermined rate determined by operation of said throttle means, said compressor responsive means being responsive to the speed of said compressor driving rotor and acting on said shiftable means to shift the same with a force amounting to a direct function of said speed, said second throttle responsive means including means operably connecting said throttle means and shiftable means to shift the latter with a force proportional to the operation of said throttle means.

16. In the combination according to claim 15, said control means also including means responsive to the speed of said power rotor overruling the effectiveness of said compressor responsive means until said power rotor attains a predetermined minimum speed.

17. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotors by said gases, throttle responsive means effective to shift said adjustable means in accordance with operation of said throttle means, and acceleration means responsive to an operating condition of said engine to overrule said throttle responsive means to effect shifting of said adjustable means to a compressor accelerating position for imparting comparatively high power to said compressor driving rotor, said means responsive to an operating condition of said engine including compressor responsive means and second throttle responsive means operable in opposition to each other, said compressor responsive means being increasingly effective as a function of the rate of operation of said compressor to overrule operation of said acceleration means, and said second throttle responsive means being increasingly effective as a function of the operation of said throttle means tending to supply fuel to said engine to oppose operation of said compressor responsive means, means for overruling operation of said acceleration means when said compressor is operating at more than a predetermined rate, and means for blocking operation of said means responsive to an operating condition of said engine and thereby to overrule operation of said acceleration means when said power rotor is operating at less than a predetermined speed.

18. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotors by said gases, throttle responsive means effective to shift said adjustable means in accordance with operation of said throttle means, and acceleration means responsive to an operating condition of said engine to overrule said throttle responsive means to effect shifting of said adjustable means to a compressor accelerating position for imparting comparatively high power to said compressor driving rotor, said acceleration means including means responsive to the speed of said power rotor to effect shifting of said adjustable means to said compressor accelerating condition when said power rotor is operating at less than a predetermined speed.

19. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotors by said gases, throttle responsive means effective to shift said adjustable means in accordance with operation of said throttle means, and acceleration means responsive to an operating condition of said engine to overrule said throttle responsive means to effect shifting of said adjustable means to a compressor accelerating position for imparting comparatively high power to said compressor driving rotor, said means responsive to an operating condition of said engine including compressor responsive means and second throttle responsive means operable in opposition to each other, said compressor responsive means being responsive to operation of said compressor to overrule operation of said acceleration means with an effectiveness proportional to the pressure of the air supplied by said compressor, and said second throttle responsive means being responsive to operation of said throttle means and opposing operation of said compressor responsive means with an effectiveness proportional to the operation of said throttle means tending to supply fuel to said engine.

20. In a multiple stage gas turbine engine having a compressor driving rotor in one stage and a power rotor in a subsequent stage, an air compressor driven by said compressor driving rotor for supplying combustion air to said engine, operable throttle means for supplying fuel to said engine, means for conducting motive gases to said rotors to rotate the same, adjustable means in the path of said gases for varying the power imparted to said rotors by said gases, throttle responsive means effective to shift said adjustable means in accordance with operation of said throttle means, acceleration means operative to overrule said throttle responsive means and shift said adjustable means to a compressor accelerating position for imparting comparatively high power to said compressor driving rotor, and control means for said acceleration means, said control means including second throttle responsive means responsive to operation of said throttle means for yieldingly urging operation of said acceleration means, said control means also including means responsive to operation of said compressor for yieldingly opposing said second throttle responsive means to prevent operation of said acceleration means.

21. In the combination according to claim 20, means for blocking operation of said control means and thereby to overrule operation of said acceleration means when said power rotor is operating at less than a predetermined speed.

22. In the combination according to claim 20, means for overruling operation of said acceleration means when said compressor is operating at more than a predetermined rate, and means for blocking operation of said control means and thereby to overrule operation of said acceleration means when said power rotor is operating at less than a predetermined speed.

23. In the combination according to claim 20, means for operating said acceleration means to effect shifting of said adjustable means to said compressor accelerating condition when said power rotor is operating at less than a predetermined speed.

24. In a multiple stage gas turbine engine having a compressor driving rotor in one stage and a power rotor in a subsequent stage, an air compressor driven by said compressor driving rotor for supplying combustion air to said engine, throttle means having an operating member progressively shiftable to an open position for progressively increasing the fuel supply to said engine, means for conducting motive gases to said rotors to rotate the same, adjustable means in the path of said gases for varying the power imparted to said rotors by said gases, one of the positions of adjustment of said adjustable means comprising a compressor accelerating position for imparting comparatively low power to said power rotor and comparatively high power to said compressor driving rotor, throttle responsive means responsive to operation of said throttle means for selectively shifting said adjustable means to prorate the power of said motive gases between said compressor driving and power rotors, and compressor accelerating means shiftable to a position for overriding said throttle responsive means to shift said adjustable means to said accelerating position, control means for said accelerating means, means yieldingly urging said control means with a force proportional to the extent of opening movement of said operating member to a position for maintaining said accelerating means at its overriding position, and means yieldingly urging said control means from said position in opposition to said force with combined forces proportional respectively to the speed of said compressor and the pressure of the air supplied thereby for shifting said accelerating means from its overriding position.

References Cited in the file of this patent
UNITED STATES PATENTS

| | | |
|---|---|---|
| 2,625,789 | Starkey | Jan. 20, 1953 |
| 2,715,814 | Barr | Aug. 23, 1955 |
| 2,912,824 | Van Nest et al. | Nov. 17, 1959 |